US012710996B2

(12) United States Patent
Chen et al.

(10) Patent No.: US 12,710,996 B2
(45) Date of Patent: Aug. 18, 2026

(54) NUMA AWARENESS ARCHITECTURE FOR VM-BASED CONTAINER IN KUBERNETES ENVIRONMENT

(71) Applicant: Databricks, Inc., San Francisco, CA (US)

(72) Inventors: Shuo Chen, San Francisco, CA (US); Yuming Qiao, San Francisco, CA (US); Anders Liu, San Francisco, CA (US)

(73) Assignee: Databricks, Inc., San Francisco, CA (US)

( * ) Notice: Subject to any disclaimer, the term of this patent is extended or adjusted under 35 U.S.C. 154(b) by 536 days.

(21) Appl. No.: 18/162,659

(22) Filed: Jan. 31, 2023

(65) Prior Publication Data

US 2024/0256360 A1 Aug. 1, 2024

(51) Int. Cl.
*G06F 9/50* (2006.01)
*G06F 9/455* (2018.01)

(52) U.S. Cl.
CPC ........ *G06F 9/5077* (2013.01); *G06F 9/45558* (2013.01); *G06F 2009/4557* (2013.01); *G06F 2009/45583* (2013.01)

(58) Field of Classification Search
CPC ............... G06F 9/5077; G06F 9/45558; G06F 2009/4557; G06F 2009/45583; G05F 2009/4557; G05F 2009/45583
See application file for complete search history.

(56) References Cited

U.S. PATENT DOCUMENTS 11,625,175 B1 4/2023 Krasilnikov et al.
11,915,026 B1 * 2/2024 Chandrashekar ..... G06F 9/5077
2013/0054888 A1 * 2/2013 Bhat ......................... G06F 9/00 711/E12.001
2016/0055016 A1 * 2/2016 Beveridge ............. G06F 9/4451 718/1
2016/0085571 A1 3/2016 Kim et al.
2016/0179560 A1 * 6/2016 Ganguli .............. G06F 11/3006 718/1
2017/0060636 A1 3/2017 Smith et al.

(Continued)

OTHER PUBLICATIONS

Unknown Author ("How to use Container Station 3?", www.qnap.com/en-us/how-to/tutorial/article/how-to-use-container-station-3, Nov. 24, 2022) (Year: 2022).*

(Continued)

*Primary Examiner* — Lewis A Bullock, Jr.
*Assistant Examiner* — Kevin X Lu
(74) *Attorney, Agent, or Firm* — Fenwick & West LLP

(57) ABSTRACT

Disclosed herein is a method for resource management in a web-based container orchestrating environment. A disclosed method includes initializing a set of micro-virtual machines (VMs) within a macro-VM environment. The method each container within a micro-VM based sandbox. The method assigns a virtual central processing unit (vCPU) to a micro-VM based on an estimated memory required by the micro-VM and the estimated available memory associated with the vCPU. The method pins the vCPU with a physical CPU based on the pod location of the physical CPU and an estimated available memory associated with the vCPU and an available local memory of the physical CPU. The method maintains a state of the vCPU and the physical CPU in a resource manager.

20 Claims, 8 Drawing Sheets

(56) References Cited

U.S. PATENT DOCUMENTS

| | | | | |
|---|---|---|---|---|
| 2017/0168715 | A1* | 6/2017 | Eshwarappa | G06F 9/45558 |
| 2019/0332275 | A1* | 10/2019 | Jin | G06F 11/2097 |
| 2020/0125721 | A1 | 4/2020 | Antony et al. | |
| 2020/0201616 | A1* | 6/2020 | Mueller | G06F 9/45558 |
| 2021/0303356 | A1 | 9/2021 | Tsirkin et al. | |
| 2022/0391250 | A1* | 12/2022 | Browne | G06F 9/45558 |
| 2024/0028361 | A1 | 1/2024 | Gadepalli et al. | |

OTHER PUBLICATIONS

U.S. Office Action, U.S. Appl. No. 18/162,637, Aug. 12, 2025, 17 pages.

Liu et al. "Optimizing virtual machine consolidation performance on NUMA server architecture for cloud workloads," 2014 ACM/IEEE 41st International Symposium on Computer Architecture (ISCA), Minneapolis, MN, USA, 2014, pp. 325-336. (Year: 2014).

Cheng et al. "Performance-Monitoring-Based Traffic-Aware Virtual Machine Deployment on NUMA Systems," in IEEE Systems Journal, vol. 11, No. 2, pp. 973-982, Jun. 2017. (Year: 2017).

* cited by examiner

Data Storage System 110
Network 120
Client Device 116B
Client Device 116A
Data Processing Service 102
Control Layer 106
Data Layer 108
100

NUMA AWARENESS ARCHITECTURE FOR VM-BASED CONTAINER IN KUBERNETES ENVIRONMENT

TECHNICAL FIELD

This disclosure relates generally to the management of resources in container orchestration environments for interacting with cloud-based object storage systems.

BACKGROUND

As cloud computing continues to grow, computing services take advantage of the clustered resources, e.g., physical central processing unit (CPU), memory and storage, of cloud computing providers. To access these physical resources, the cloud computing provider provides a virtual machine (VM) for a computing service to have access to the physical computing resources.

As cloud computing has grown, container technologies such as KUBERNETES also have grown to operate within a virtual machine. With container technology, a primary node agent, such as the kubelet in the KUBERNETES environment, creates a pod comprising multiple containers. For multi-tenant safe container technology, containers are associated with a micro-virtual machine (micro-VM) within which the computing service is operating. Each micro-VM may be assigned to a tenant. Tenants comprise individuals, companies, data services, and other entities that may request cloud-based computing resources, for example, object storage data management.

Some computing services such as database queries and tenant requests are physical compute resource intensive. Hence, with limited physical CPU processing power and memory availability, a macro-VM with resource-demanding micro-VMs may cause excessive strain on the actual physical resources such as data memory, and slow down overall processing.

Figure 1:
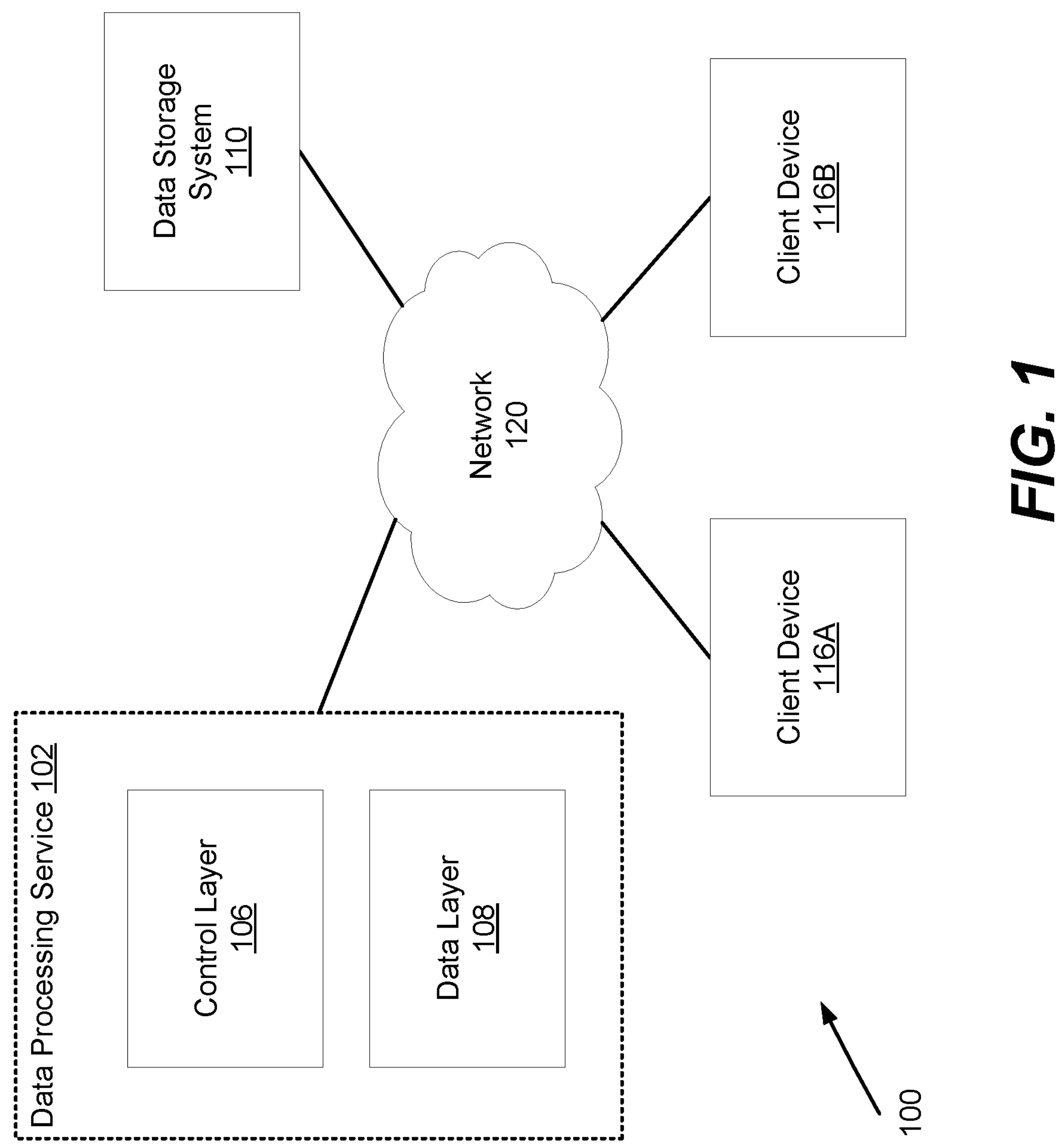
FIG. 1 is a high-level block diagram of a system environment for a data processing service, in accordance with an embodiment.

The figures depict various embodiments of the present invention for purposes of illustration only. One skilled in the art will readily recognize from the following discussion that alternative embodiments of the structures and methods illustrated herein may be employed without departing from the principles described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed are configurations (e.g., method, system, and/or non-transitory computer readable storage medium comprising stored instructions) for mapping and managing non-uniform memory access (NUMA) nodes for containers in a virtual machine environment. For example, a system may initialize a set of micro-virtual machines (VMs) within a macro-VM environment. For each micro-VM, the system generates a sandbox and a container. The system assigns a virtual central processing unit (vCPU) to a micro-VM in the set of micro-VMs, the vCPU assigned based on an estimated memory required by the micro-VM and the estimated available memory associated with the vCPU. The estimated memory associated with the vCPU may be the available memory of the NUMA that a vCPU resides on. Additional considerations may be made in selecting a vCPU to assign to a micro-VM. The system pins the vCPU to a physical CPU of a plurality of physical CPUs. The vCPU may be paired with a physical CPU based on the pod location of the physical CPU and an estimated available memory of the physical CPU. The system maintains a state of the vCPU and the physical CPU in a resource manager.

Additionally disclosed is a system for user-directed NUMA architecture in a container orchestration environment. The system comprises initializing a set of micro-VMs within a macro-VM environment. For each micro-VM, the system generates a sandbox and a container. The system additionally assigns a vCPU to each micro-VM in the set of micro-VMs. The system selects a vCPU assigned to a micro-VM based on an estimated memory required by the micro-VM and an estimated available memory of the NUMA associated with the vCPU. The system may evaluate additional parameters in assigning a vCPU to a micro-VM. The system additionally maintains a mapping of micro-VMs to nodes in the vCPU in a resource manager. Each vCPU is pinned to a physical CPU. The system displays the mapping of VMs to nodes in the vCPU on a user interface. The user may input instructions to alter the mapping. The system receives instructions to shift the VM mappings and shifts the assigned micro-VMs based on the instructions.

Example System Environment

Turning now to Figure (FIG. 1, illustrated is a high-level block diagram of a system environment 100 for a data processing service 102, in accordance with an embodiment. The system environment 100 shown by FIG. 1 includes one or more client devices 116A, 116B, a network 120, a data processing service 102, and a data storage system 110. In alternative configurations, different and/or additional components may be included in the system environment 100.

The data processing service 102 is a service for managing and coordinating data processing services to users of client devices 116. The data processing service 102 may manage one or more applications that users of client devices 116 may use to communicate with the data processing service 102. Through an application of the data processing service 102, the data processing system 102 may receive requests from users of client devices 116 to perform one or more data processing functionalities on data stored, for example, in the data storage system 110. The requests may include query requests, analytics requests, or machine learning and artificial intelligence requests, and the like, on data stored in the data storage system 110. The data processing service 102 may provide responses to the requests to the users of the client devices 116 after they have been processed.

In one embodiment, as shown in the system environment 100 of FIG. 1, the data processing service 102 includes a control layer 106 and a data layer 108. The components of the data processing service 102 may be configured by one or more servers and/or a cloud infrastructure platform. In one embodiment, the control layer 106 receives data processing requests and coordinates with the data layer 108 to process the requests from client devices 116. The control layer 106 may schedule one or more jobs for a request or receive requests to execute one or more jobs from the user directly through a respective client device 116. The control layer 106 may distribute the jobs to components of the data layer 108 where the jobs are executed.

The control layer 106 is additionally capable of configuring the clusters in the data layer 108 that are used for executing the jobs. For example, a user of a client device 116 may submit a request to the control layer 106 to perform one or more queries and may specify that four clusters on the data layer 108 be activated to process the request with certain memory requirements. Responsive to receiving this information, the control layer 106 may send instructions to the data layer 108 to activate the requested number of clusters and configure the clusters according to the requested memory requirements.

The data layer 108 includes multiple instances of clusters of computing resources that execute one or more jobs received from the control layer 106. In one instance, the clusters of computing resources are virtual machines or virtual data centers configured on a cloud infrastructure platform. In one instance, the data layer 108 is configured as a multi-tenant architecture where a plurality of data layer instances process data pertaining to various tenants of the data processing service 102. For example, a respective data layer instance can be implemented for a respective tenant. However, it is appreciated that in other embodiments, single tenant architectures may be used.

The data layer 108 thus may be accessed by, for example, a developer through an application of the control layer 106 to execute code developed by the developer. In one embodiment, a cluster in a data layer 108 may include multiple worker nodes that execute multiple jobs in parallel. Responsive to receiving a request, the data layer 108 divides the cluster computing job into a set of worker jobs, provides each of the worker jobs to a worker node, receives worker job results, stores job results, and the like. The data layer 108 may include resources not available to a developer on a local development system, such as powerful computing resources to process very large data sets. In this manner, when the data processing request can be divided into jobs that can be executed in parallel, the data processing request can be processed and handled more efficiently with shorter response and processing time.

The data storage system 110 includes a device (e.g., a disc drive, a hard drive, a semiconductor memory) used for storing database data (e.g., a stored data set, portion of a stored data set, data for executing a query). In one embodiment, the data storage system 110 includes a distributed storage system for storing data and may include a commercially provided distributed storage system service. Thus, the data storage system 110 may be managed by a separate entity than an entity that manages the data processing service 102 or the data management system 110 may be managed by the same entity that manages the data processing service 102.

The client devices 116 are computing devices that display information to users and communicates user actions to the systems of the system environment 100. While two client devices 116A, 116B are illustrated in FIG. 1, in practice many client devices 116 may communicate with the systems of the system environment 100. In one embodiment, a client device 116 is a conventional computer system, such as a desktop or laptop computer. Alternatively, a client device 116 may be a device having computer functionality, such as a personal digital assistant (PDA), a mobile telephone, a smartphone or another suitable device. A client device 116 is configured to communicate via the network 120, which may comprise any combination of local area and/or wide area networks, using both wired and/or wireless communication systems.

In one embodiment, a client device 116 executes an application allowing a user of the client device 116 to interact with the various systems of the system environment 100 of FIG. 1. For example, a client device 116 can execute a browser application to enable interaction between the client device 116 and the data processing system 106 via the network 120. In another embodiment, the client device 116 interacts with the various systems of the system environment 100 through an application programming interface (API) running on a native operating system of the client device 116, such as IOS® or ANDROID™.

Figure 2A:
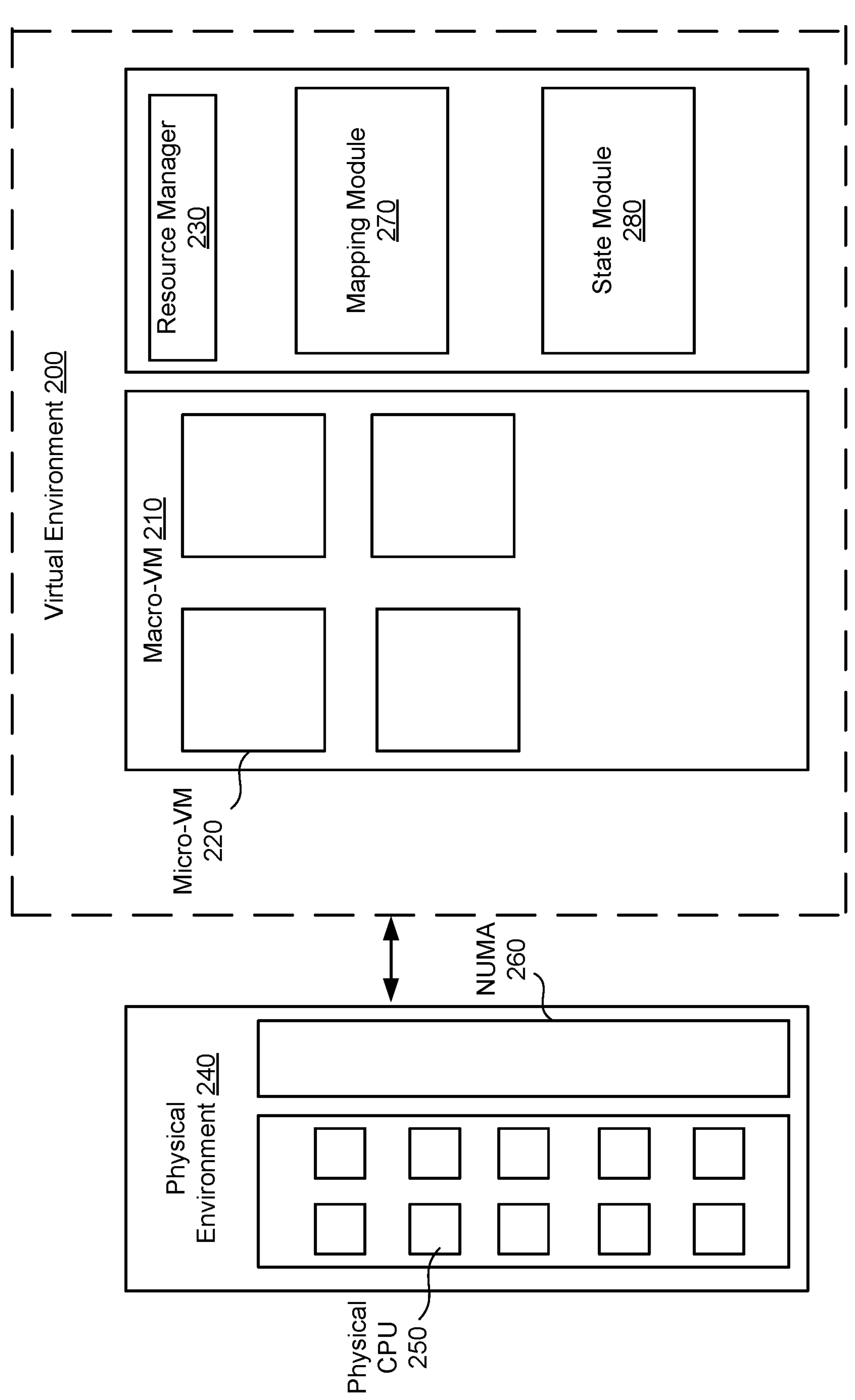
FIG. 2A is a block diagram of a data storage system comprising a physical environment and virtual environment.

FIG. 2A illustrates an example physical environment 240 and virtual environment 200 in communication, which may be organized by the data processing service 102. The physical environment 240 is a physical processing environment that in this example houses one or more CPU cores (or CPUs) 250 and a memory bank that is a non-uniform memory access, or NUMA, 260 bank. The NUMA 260 may be on a motherboard containing multiple slots, each slot corresponding to a NUMA node. Each NUMA node in the NUMA 260 may be associated with and/or connected to a physical CPU 250. By way of example, a first subset of the CPUs 250 may have direct access to a first node of the NUMA 260 and a second subset of the CPU 250 may have direct access to a second node of the NUMA 260. The CPUs 250 may be further broken down into sets and assigned a particular NUMA node.

The multiple NUMA nodes in the NUMA 260 share a bus through which data, text, runnable code, and visualizations may be transported. However, using the NUMA bus may create a bottleneck for memory access if multiple NUMA nodes are transferring large quantities of data at once. Therefore, it may be advantageous to group resources within a local NUMA node, to the extent possible.

Figure 2B:
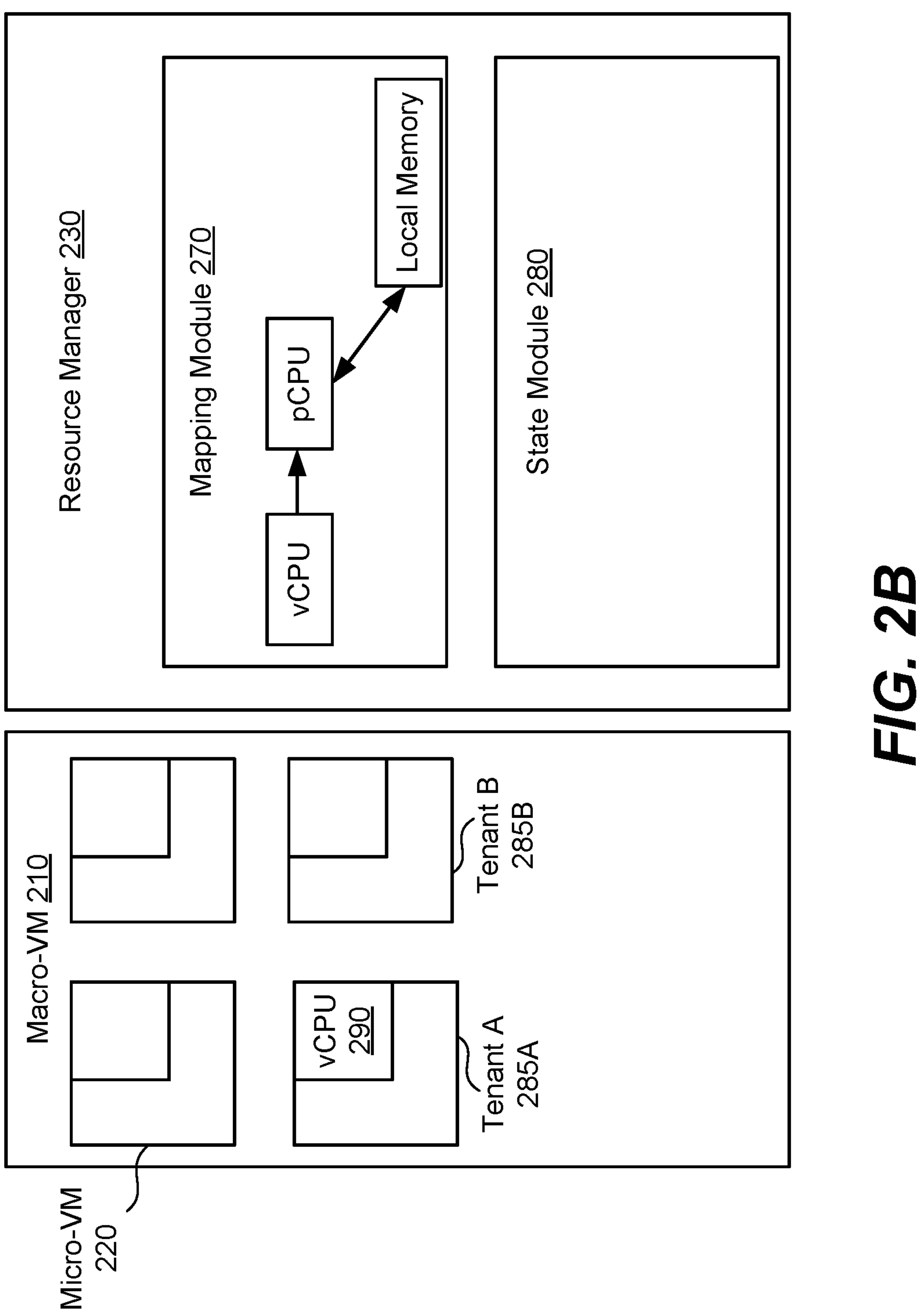
FIG. 2B is a block diagram of a virtual environment for managing virtual machines.

Referring still to FIG. 2A, virtual environment 200 comprises a macro-VM 210 containing a plurality of micro-VMs 220. Each micro-VM 220 may comprise clusters configured to execute jobs from the data processing service 102. A sandbox and a container for each micro-VM 220 may be produced in the macro-VM. Referring to FIG. 2B, each micro-VM 220 may be assigned a virtual CPU (vCPU) 290. In some embodiments, each micro-VM 220 may be assigned to a single tenant. Tenant A 285A may be an individual, company, and/or a data processing service 102 user or client. Each tenant 285 is assigned a micro-VM and sandbox for their data processing and management.

With reference to FIG. 2A, the virtual environment 200 further comprises a resource manager 230, mapping module 270, and state module 280. The resource manager 230 monitors both the mapping module 270 and state module 280 with a hypervisor shim. The hypervisor shim is programmed to direct resources for a container orchestration system such as the KUBERNETES flow, in some embodiments. The hypervisor shim in the resource manager 230 receives an original command for creating a new container comprising a sandbox and micro-VM 220 from the data processing service 102. The resource manager 230 maintains a state for each vCPU in the plurality of available vCPUs using the state module 280. The state module 280 may monitor the workload of each physical CPU 250. If any given physical CPU 250 is determined to have a workload higher than other physical CPUs for a predetermined period of time, the state module 280 may redirect query processing from that physical CPU to other physical CPUs. The state module 280 may prevent micro-VM queries from being assigned to a given physical CPU 250 that is determined to have a higher workload than other physical CPUs for a predetermined period of time. The resource manager 230 uses the hypervisor shim and the state module 280 to determine which vCPU is assigned to the new sandbox and micro-VM 220. The resource manager 230 may determine which vCPU is assigned to the micro-VM 220 based on multiple parameters such as: an estimated memory required for the micro-VM, an estimated availability of physical CPUs 250, an associated NUMA node location, and other relevant parameters. As illustrated in FIG. 2B, the mapping module 270 maps vCPUs to physical CPUs (pCPUs) and local memory. Memory may be correlated with the NUMA nodes in the NUMA 260. In some embodiments, when the resource manager 230 creates a new container corresponding to a sandbox and micro-VM, a known quantity of memory is known to be necessary for the container. The mapping module may be used to determine which physical CPU and vCPU have the capacity for the necessary quantity of memory and the resource manager 230 may pin the selected vCPU to the physical CPU.

Example Control Layer Architecture

Figure 3:
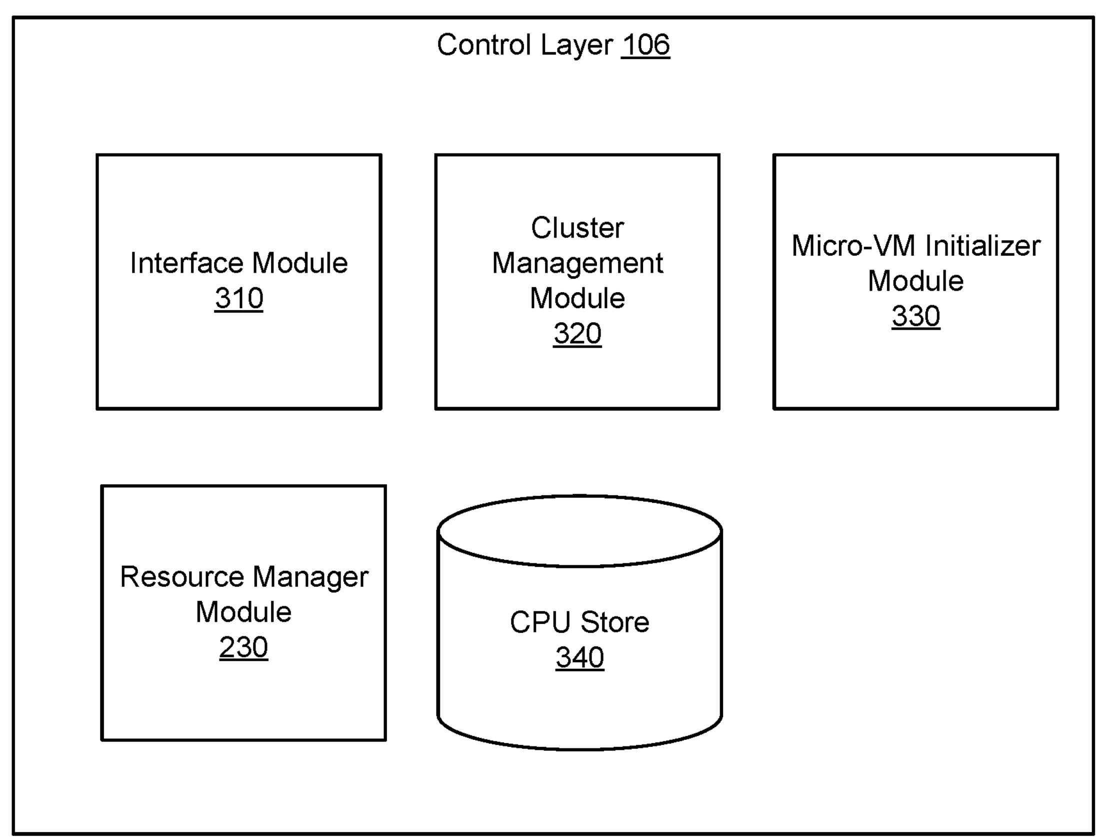
FIG. 3 illustrates a block diagram of an architecture of a control layer, in accordance with an embodiment.

FIG. 3 is a block diagram of an architecture of a control layer 106, in accordance with an embodiment. In one embodiment, the data processing system 106 includes an interface module 310, a cluster management module 320, a micro-VM initializer module 330, a resource manager module 230, and a CPU store 340.

The interface module 310 provides an interface and/or a workspace environment where users of client devices 116 (e.g., users associated with tenants) can access resources of the data processing service 102. For example, the user may retrieve information from data tables associated with a tenant or submit data processing requests such as query requests on the data tables through the interface provided by the interface module 310. The interface provided by the interface module 310 may include notebooks, libraries, experiments, and queries submitted by the user. In one embodiment, a user may access the workspace via a user interface (UI), a command line interface (CLI), or an application programming interface (API).

For example, a notebook associated with a micro-VM environment is a web-based interface to a document that includes executable code, visualizations, and explanatory text. A user may submit data processing requests on data tables in the form of one or more notebook queries. The user provides code for executing the one or more queries and indications such as the desired time for execution, a number of cluster worker nodes for the queries, cluster configurations, a notebook version, input parameters, authentication information, output storage locations, or any other type of indications for executing the queries. The cluster management module 320 may take the user data processing requests and assign clusters to the request. The user may also view or obtain results of executing the jobs via a workspace.

The micro-VM initializer module 330 creates micro-VMs 220 in the macro-VM environment 210. In some embodiments, the micro-VM initializer module 330 takes the user input including runnable code, visualizations, and explanatory text and creates a micro-VM associated with the request. The micro-VM initializer module 330 sets up a set of sandboxes, containers, and operating environments for each tenant of the data processing system 102. The micro-VM initializer module 330 further pairs each micro-VM with a vCPU out of a plurality of available vCPUs. To create the pairs, micro-VM initializer module 330 may generate an identifier such as a number for the new micro-VM. The micro-VM provides the resource manager module 230 with the micro-VM identifier. The resource manager 230 may select a vCPU to pair with the micro-VM based on the vCPU having an available memory that fits the user input. The resource manager 230 may additionally select a vCPU to pair with the micro-VM based on a tenant pod with which the vCPU is associated. The resource manager selects the vCPU from a plurality of vCPUs in the CPU store 340. The CPU store 340 additionally maintains an array of physical CPUs.

Figure 4A:
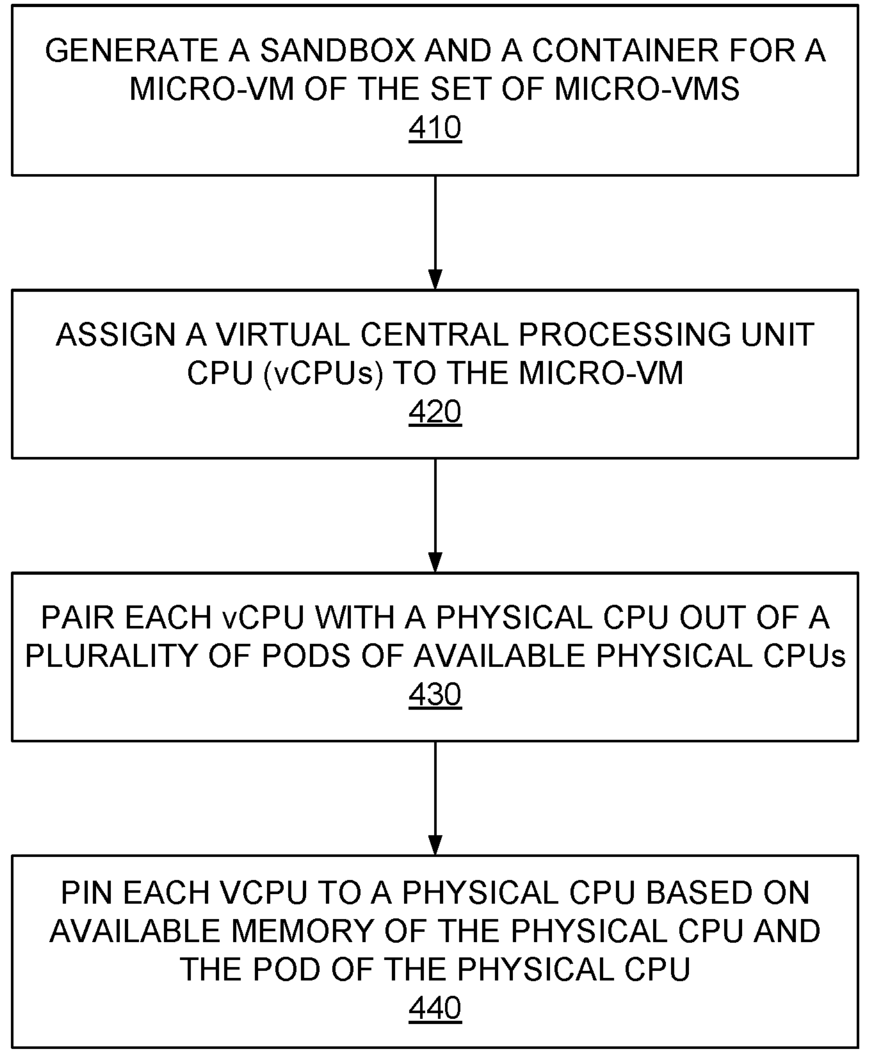
FIG. 4A is a flowchart depicting a method for pinning a virtual CPU to a physical CPU, in accordance with some embodiments.

FIG. 4A illustrates an example method for pinning, or binding, one or more threads of each vCPU to a physical CPU based on available memory of the physical CPU and the pod of the physical CPU 440. The method includes generating 410 a sandbox and a container for a micro-VM of a set of micro-VMs created by the micro-VM initializer module 330. The micro-VM initializer module 330 may assign the micro-VM an identifier, such as a numerical code. Once the micro-VM is set up with the sandbox and the container, the method assigns 420 a vCPU to the micro-VM. The resource manager module 230 selects a vCPU from a plurality of available vCPUs in the CPU store 340. The resource manager module 230 may select the vCPU based on the vCPU's available memory or a tenant pod with which the vCPU is associated. The method includes pairing 430 each vCPU with a physical CPU out of a plurality of pods of available physical CPUs. The resource manager 230 consults the mapping module 270 and state module 280 to determine which physical CPU 250 to pair with the vCPU. In some embodiments, the physical CPU 250 that is selected to pair with the vCPU is located in a tenant pod associated with the micro-VM. NUMA nodes associated with the tenant may be located near the tenant pod of physical CPUs. Therefore, by selecting a physical CPU in the tenant pod to pair with the vCPU, memory access and data transfer may be more efficient. The method further includes pinning 440 each vCPU to a physical CPU based on available memory of the physical CPU and the pod of the physical CPU. In some embodiments, the resource manager 230 may determine which vCPU to pin to a physical CPU 250 based on the memory and processing demands of the micro-VM associated with the vCPU. The resource manager 230 may determine the available memory of a physical CPU 250 from the state module 280. The resource manager 230 may determine the pod of a physical CPU 250 from the mapping module 270. In some embodiments, if the state module 280 determines that a given physical CPU has been overworked, that physical CPU will not be selected to pair with the vCPU.

Figure 4B:
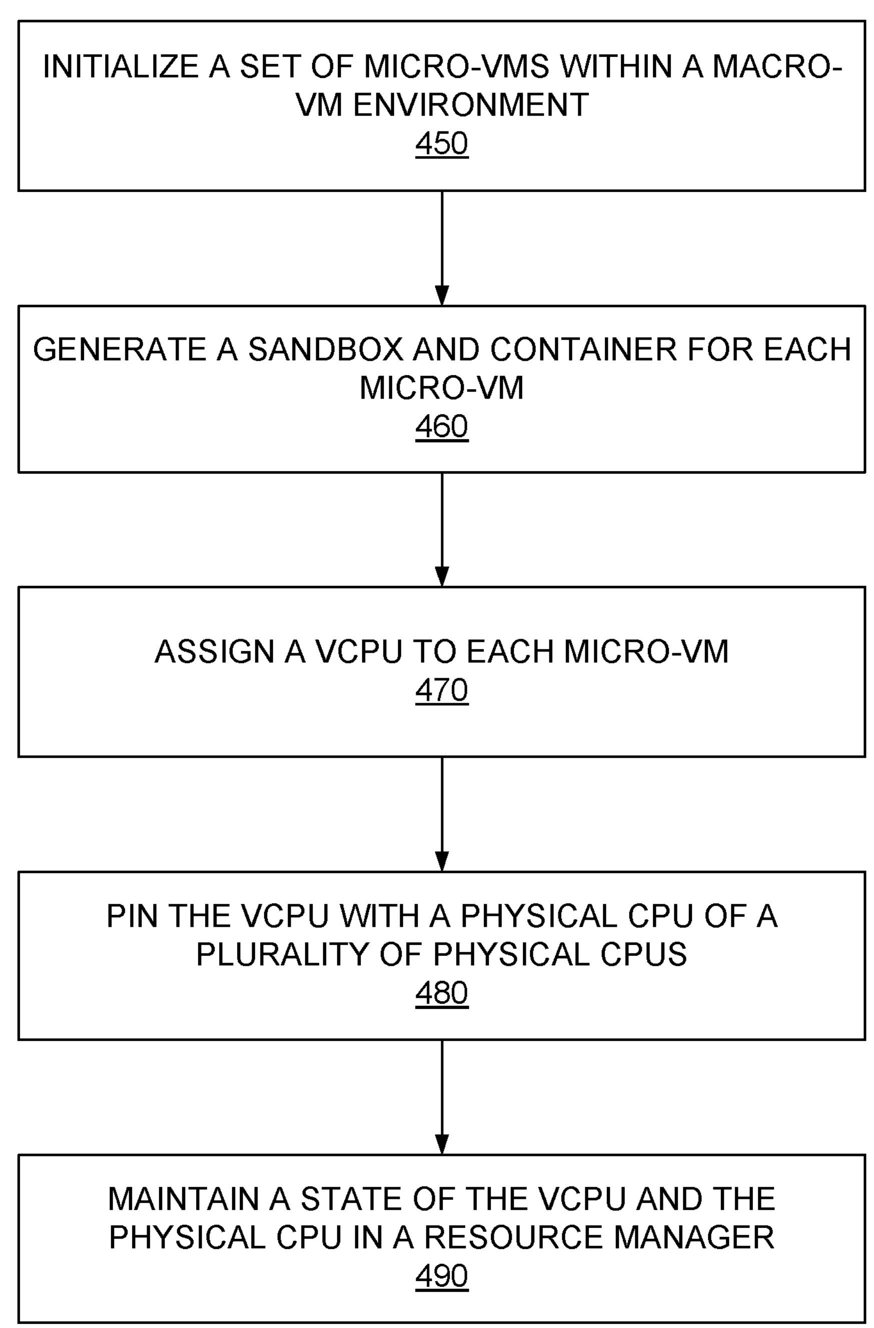
FIG. 4B is a flowchart depicting a method for managing the resources for a macro-VM memory environment, in accordance with some embodiments.

FIG. 4B depicts a more detailed method for pinning a vCPU to a physical CPU based on available memory of the physical CPU and the pod of the physical CPU, in accordance with some embodiments. The micro-VM initializer module 330 initializes 450 a set of micro-VMs 220 within a macro-VM environment 210. The micro-VMs may be assigned to specific tenants 285, or may be created for future tenant requests. The micro-VM initializer module 330 generates 460 a sandbox and container for each micro-VM 220. The resource manager 230 assigns 470 a vCPU to each micro-VM 220. The resource manager 230 may determine a vCPU 290 to assign to a micro-VM 220 based on the vCPU's available memory.

The resource manager 230 pins 480 the vCPU 290 with a physical CPU 250 of a plurality of physical CPUs. The vCPU 290 may be pinned with a physical CPU based on the pod location of the physical CPU 250. If a physical CPU 250 is located in a cluster of physical CPUs assigned to a plurality of vCPUs for the same tenant that the vCPU is associated with, then the physical CPU 250 may be selected to be pinned with the vCPU. Physical CPUs 250 may be preferred for a vCPU 290 if the physical CPUs 250 are associated with the same tenant. Pinning the vCPU 290 with a physical CPU 250 means that at least the query processing assigned to the vCPU 290 is performed on the physical CPU 250. A vCPU 290 may be pinned to a physical CPU 250 based on the physical CPU 250 having an available processing power capable of managing processing requests associated with the vCPU 290. The state module 280 maintains 490 a state of the vCPU and the physical CPU in a resource manager 230. The state of the vCPU and the physical CPU may include a portion of queries processed by the physical CPU and/or an amount of data processed by the physical CPU. The resource manager 230 may use the state of the vCPU and physical CPUs to inform subsequent CPU pairings. The resource manager 230 may use the state of the vCPU to adjust pairings. If a request is received to change an amount of available memory for a micro-VM, the resource manager 230 may shift the vCPU and physical CPU pairings. The resource manager 230 may adjust pairings of vCPUs and physical CPUs based on the physical CPU having a workload higher than other physical CPUs in the set of physical CPUs for a predetermined set period of time. The state module 280 may monitor a workload for a physical CPU in the plurality of physical CPUs with the resource manager 230 in order to determine the workload of a physical CPU.

The method of FIG. 4B may be iterative. The method may comprise assigning a second vCPU to a second micro-VM in the set of micro-VMs. The vCPU may be assigned based on an estimated memory required by the second micro-VM and the estimated available memory of the second vCPU. The method may include pinning the second vCPU with a second physical CPU of the plurality of physical CPUs. The second vCPU is paired with a second physical CPU based on the pod location of the second physical CPU and an estimated available memory of the second vCPU, in some embodiments. The method may include maintaining a state of the second vCPU and the second physical CPU in the resource manager 230.

User-Directed Numa Awareness Architecture

Figure 5:
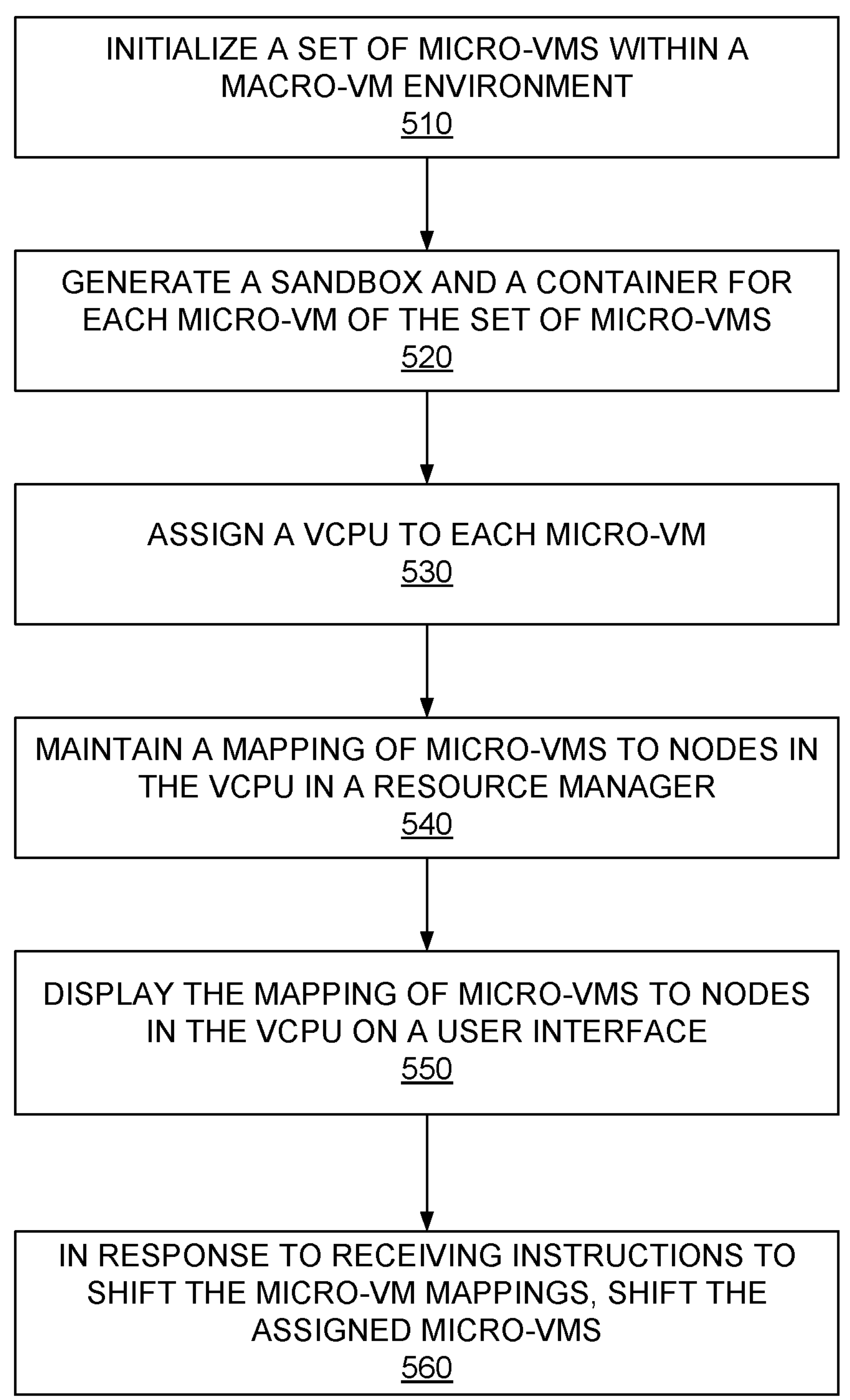
FIG. 5 is a flowchart depicting a method for applying user input to the NUMA architecture of a macro-VM environment, in accordance with some embodiments.

FIG. 5 illustrates a method for shifting micro-VM mappings in response to receiving instructions to shift micro-VM mappings. The method includes initializing 510 a set of micro-VMs 220 within a macro-VM environment 210. The micro-VM initializer module 330 may initialize the set of micro-VMs based on a client device 116 user input, in some embodiments. The micro-VM initializer module 330 generates 520 a sandbox and a container for each micro-VM 220 in the set of micro-VMs.

The resource manager 230 assigns a vCPU 290 to each micro-VM 220. A vCPU 290 may be assigned to a micro-VM 220 based on the vCPU's available memory or processing capacity. The resource manager 230 maintains 540 a mapping of micro-VMs 220 to nodes in the vCPU 290. Each vCPU 290 may be pinned to a physical CPU 250. The resource manager 230 may use the mapping module 270 to maintain a mapping of micro-VMs to nodes in the vCPU 290. The mapping module 270 provides a mapping of vCPU nodes. The tenant assigned to a node in the vCPU is tracked by the mapping module 270 and provided to the resource manager 230. The vCPU 290 nodes correspond to NUMA nodes in the NUMA 260, in accordance with some embodiments.

The interface module 310 displays 550 the mapping of micro-VMs to nodes in the vCPU on a client device 116. The user of client device 116 may provide input to rearrange or modify the mapping of micro-VMs to nodes in the vCPU. In response to receiving instructions to shift the micro-VM mappings, the resource manager 230 shifts 560 the assigned micro-VMs. The resource manager 230 shifts the micro-VMs based on the instructions provided by the user of client device 116. In some embodiments, the user may request to place their micro-VMs on nodes in the vCPU 290 and corresponding NUMA 260 that are in closer proximity than the originally mapped nodes. This may prevent the use of a shared NUMA bus, which may otherwise create a bottleneck in data transfer and processing.

Example Computing System Architecture

Figure 6:
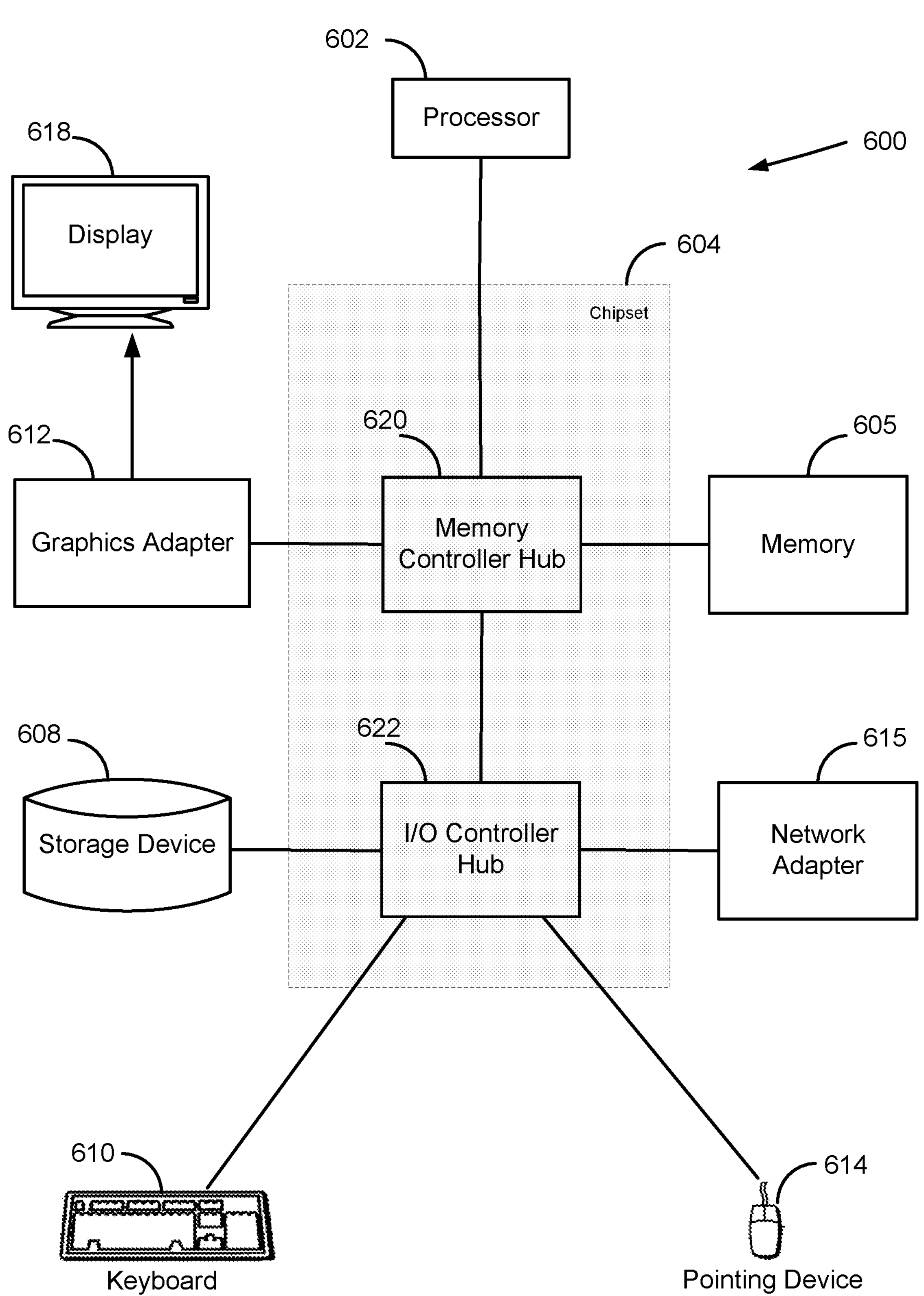
FIG. 6 is a diagram of an example computing device architecture in accordance with one embodiment.

FIG. 6 is a block diagram of an example computer 600. The computing system may be structured to support execution of the macro-VM and micro-VMs as well as the operational modules described in FIGS. 1 through 5. The example computer 600 includes at least one processor 602 coupled to a chipset 604. The chipset 604 includes a memory controller hub 620 and an input/output (I/O) controller hub 622. A memory 605 and a graphics adapter 612 are coupled to the memory controller hub 620, and a display 618 is coupled to the graphics adapter 612. A storage device 608, keyboard 610, pointing device 614, and network adapter 615 are coupled to the I/O controller hub 622. Other embodiments of the computer 600 have different architectures.

In the embodiment shown in FIG. 6, the storage device 608 is a non-transitory computer-readable storage medium such as a hard drive, compact disk read-only memory (CD-ROM), DVD, or a solid-state memory device. The memory 605 holds instructions and data used by the processor 602. The pointing device 614 is a mouse, track ball, touch-screen, or other type of pointing device, and may be used in combination with the keyboard 610 (which may be an on-screen keyboard) to input data into the computer system 600. The graphics adapter 612 displays images and other information on the display 618. The network adapter 615 couples the computer system 600 to one or more computer networks, such as network 120.

The types of computers used by the processing entities of FIG. 1 can vary depending upon the embodiment and the processing power required by the entity. For example, data processing service 102 might include multiple blade servers working together to provide the functionality described. Furthermore, the computers can lack some of the components described above, such as keyboards 610, graphics adapters 612, and displays 618

Additional Considerations

The disclosed configurations beneficially allow for allocation of physical resources to virtual resources to enable more efficient and faster processing of services within a virtual machine. In some embodiments, a resource manager creates pairings of virtual CPUs with physical CPUs based on the pod location and available memory of the physical CPU. The resource manager may be used to track workload demands and assigned tenants for a plurality of physical CPUs. Using the workload demands and assigned tenants, the resource manager may alter the architecture of virtual resources, allowing for increased efficiency within the virtual machine.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:

initializing a set of micro-virtual machines (VMs) within a macro-VM environment;

generating a sandbox and a container for each micro-VM of the set of micro-VMs;

assigning a virtual central processing unit (vCPU) to a container of a respective micro-VM in the set of micro-VMs, the respective micro-VM is within a tenant specific pod in the macro-VM environment, the vCPU assigned is determined based on (i) an estimated memory required by the respective micro-VM and (ii) an estimated available memory associated with the vCPU;

selecting a physical CPU from a plurality of physical CPUs wherein the plurality of physical CPUs are within the tenant specific pod and comprised pinned vCPUs assigned to containers of micro-VMs of the tenant specific pod, and an available local memory of the selected physical CPU being equal to or greater than the estimated available memory associated with the vCPU;

pinning the vCPU with the selected physical CPU of the plurality of physical CPUs, wherein pinning includes executing workloads associated with the vCPU on the selected physical CPU within the tenant specific pod; and maintaining a state of the vCPU and the physical CPU in a resource manager.

2. The method of claim 1, wherein pinning the vCPUs vCPU with the physical CPU within the tenant specific pod based on a pod location of the physical CPU further comprises:

determining that a physical CPU is located in a cluster of physical CPUs assigned to a plurality of vCPUs for a same tenant;

pinning the vCPU to the physical CPU located in the cluster of physical CPUs assigned to the plurality vCPUs for the same tenant.

3. The method of claim 2, further comprising:

displaying a mapping of micro-VMs to nodes in the vCPU on a user interface;

receiving instructions to shift the micro-VM mappings;

shifting the assigned micro-VMs based on the instructions.

4. The method of claim 2, further comprising:

mapping tenant CPU clusters using a hypervisor shim.

5. The method of claim 1, further comprising:

maintaining states of a plurality of vCPUs pinned to a plurality of physical CPUs in the resource manager.

6. The method of claim 1, further comprising:

assigning a second vCPU to a second micro-VM in the set of micro-VMs, the vCPU assigned based on an estimated memory required by the second micro-VM and the estimated available memory of the second vCPU;

pinning the second vCPU with a second physical CPU of a plurality of physical CPUs, the second vCPU paired with a second physical CPU based on a pod location of the second physical CPU and an estimated available memory of the second vCPU and an available local memory of the second physical CPU; and maintaining a state of the second vCPU and the second physical CPU in the resource manager.

7. The method of claim 1, further comprising:

shifting the vCPU and physical CPU pairings based on a request to change an amount of available memory for the micro-VM.

8. The method of claim 1, further comprising:

monitoring a workload for a physical CPU in a plurality of physical CPUs with the resource manager; and adjusting pairs of vCPUs and physical CPUs based on the physical CPU having a workload higher than other physical CPUs for a set period of time.

9. A system comprising:

at least one processor configured to execute instructions;

at least one memory comprising stored instructions, the instructions when executed cause the at least one processor to:

initialize a set of micro-virtual machines (VMs) within a macro-VM environment;

generate a sandbox and a container for each micro-VM of the set of micro-VMs;

assign a virtual central processing unit (vCPU) to a container of a respective micro-VM in the set of micro-VMs, the respective micro-VM is within a tenant specific pod in the macro-VM environment, the vCPU assigned is determined based on (i) an estimated memory required by the respective micro-VM and (ii) an estimated available memory associated with the vCPU;

select a physical CPU from a plurality of physical CPUs wherein the plurality of physical CPUs are within the tenant specific pod and comprised pinned vCPUs assigned to containers of micro-VMs of the tenant specific pod, and an available local memory of the selected physical CPU being equal to or greater than the estimated available memory associated with the vCPU;

pin the vCPU with the selected physical CPU of the plurality of physical CPUs, wherein the instructions to pin includes instructions to execute workloads associated with the vCPU on the selected physical CPU within the tenant specific pod; and maintain a state of the vCPU and the physical CPU in a resource manager.

10. The system of claim 9, wherein the instructions to pin the vCPUs with the physical CPU within the tenant specific pod based on a pod location of the physical CPU further comprises instructions that cause the at least one processor to:

determine that a physical CPU is located in a cluster of physical CPUs assigned to a plurality of vCPUs for a same tenant;

pin the vCPU to the physical CPU located in the cluster of physical CPUs assigned to the plurality vCPUs for the same tenant.

11. The system of claim 9, further comprising instructions that cause the at least one processor to:

display a mapping of micro-VMs to nodes in the vCPU on a user interface;

receive instructions to shift the micro-VM mappings;

shift the assigned micro-VMs based on the instructions.

12. The system of claim 9, further comprising instructions that cause the at least one processor to:

maintain states of a plurality of vCPUs pinned to a plurality of physical CPUs in the resource manager.

13. The system of claim 9, further comprising instructions that cause the at least one processor to:

assign a second vCPU to a second micro-VM in the set of micro-VMs, the vCPU assigned based on an estimated memory required by the second micro-VM and the estimated available memory of the second vCPU;

pin the second vCPU with a second physical CPU of a plurality of physical CPUs, the second vCPU paired with a second physical CPU based on a pod location of the second physical CPU and an estimated available memory of the second vCPU and an available local memory of the second physical CPU; and maintain a state of the second vCPU and the second physical CPU in the resource manager.

14. The system of claim 9, further comprising instructions that cause the at least one processor to:

shift the vCPU and physical CPU pairings based on a request to change an amount of available memory for the micro-VM.

15. The system of claim 9, further comprising instructions that cause the at least one processor to:

monitor a workload for a physical CPU in a plurality of physical CPUs with the resource manager; and adjust pairs of vCPUs and physical CPUs based on the physical CPU having a workload higher than other physical CPUs for a set period of time.

16. A non-transitory computer readable medium having instructions encoded thereon that, when executed by a processor, cause the processor to:

initialize a set of micro-virtual machines (VMs) within a macro-VM environment;

generate a sandbox and a container for each micro-VM of the set of micro-VMs;

assign a virtual central processing unit (vCPU) to a container of a respective micro-VM in the set of micro-VMs, the respective micro-VM is within a tenant specific pod in the macro-VM environment, the vCPU assigned is determined based on (i) an estimated memory required by the respective micro-VM and (ii) an estimated available memory associated with the vCPU;

select a physical CPU from a plurality of physical CPUs wherein the plurality of physical CPUs are within the tenant specific pod and comprised pinned vCPUs assigned to containers of micro-VMs of the tenant specific pod, and an available local memory of the selected physical CPU being equal to or greater than the estimated available memory associated with the vCPU;

pin the vCPU with the selected physical CPU of the plurality of physical CPUs, wherein the instruction to pin includes instructions to execute workloads associated with the vCPU on the selected physical CPU within the tenant specific pod; and maintain a state of the vCPU and the physical CPU in a resource manager.

17. The non-transitory computer readable medium of claim 16, wherein the instructions that when executed cause the processor to pin the vCPUs with a physical CPU within the tenant specific pod based on a pod location of the physical CPU further comprises instructions that when executed cause the processor to:

determine that a physical CPU is located in a cluster of physical CPUs assigned to a plurality of vCPUs for a same tenant;

pin the vCPU to the physical CPU located in the cluster of physical CPUs assigned to the plurality vCPUs for the same tenant.

18. The non-transitory computer readable medium of claim 17, further comprising instructions that when executed cause the processor to:

map tenant CPU clusters using a hypervisor shim.

19. The non-transitory computer readable medium of claim 16, further comprising instructions that when executed cause the processor to:

maintain states of a plurality of vCPUs pinned to a plurality of physical CPUs in the resource manager.

20. The non-transitory computer readable medium of claim 16, further comprising instructions that when executed cause the processor to:

assign a second vCPU to a second micro-VM in the set of micro-VMs, the vCPU assigned based on an estimated memory required by the second micro-VM and the estimated available memory of the second vCPU;

pin the second vCPU with a second physical CPU of a plurality of physical CPUs, the second vCPU paired with a second physical CPU based on a pod location of the second physical CPU and an estimated available memory of the second vCPU and an available local memory of the second physical CPU; and maintain a state of the second vCPU and the second physical CPU in the resource manager.

* * * * *